United States Patent [19]

Plee et al.

[11] Patent Number: 4,930,478
[45] Date of Patent: Jun. 5, 1990

[54] METHOD OF OPERATING AN ENGINE

[75] Inventors: Steven L. Plee; Peter Hartman, both of Northborough, Mass.; Jay K. Martin, Madison, Wis.; J. Paul Nolan; Donald J. Remboski, Jr., both of Northborough, Mass.; Richard R. Ross, Shrewsbury, Mass.

[73] Assignee: Barrack Technology Limited, Marlborough, Mass.

[21] Appl. No.: 193,918

[22] Filed: May 13, 1988

[51] Int. Cl.$^5$ .................. F02P 5/14; G01L 23/22
[52] U.S. Cl. .................. 123/425; 123/435; 73/35; 73/116
[58] Field of Search .............. 123/419, 425, 435, 436, 123/494; 73/35, 116, 119 R

[56] References Cited

U.S. PATENT DOCUMENTS

| | | | |
|---|---|---|---|
| 3,978,720 | 9/1976 | Ford | 73/116 |
| 4,358,952 | 11/1982 | Maurer et al. | 73/35 |
| 4,369,748 | 1/1983 | Steinke et al. | 123/425 |
| 4,377,086 | 3/1983 | Linder et al. | 73/35 |
| 4,393,687 | 7/1983 | Muller et al. | 73/35 |
| 4,409,815 | 10/1983 | Burkel et al. | 73/35 |
| 4,412,446 | 11/1983 | Linder et al. | 73/35 |
| 4,413,509 | 11/1983 | Moser et al. | 73/117.3 |
| 4,419,212 | 12/1983 | Dietz et al. | 204/424 |
| 4,422,321 | 12/1983 | Muller et al. | 73/35 |
| 4,422,323 | 12/1983 | Linder et al. | 73/116 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,444,169 | 4/1984 | Kirisawa et al. | 73/116 X |
| 4,463,729 | 8/1984 | Blillis et al. | 123/435 X |
| 4,468,949 | 9/1984 | Linder et al. | 73/35 |
| 4,487,184 | 12/1984 | Böning et al. | 123/425 |
| 4,492,108 | 1/1985 | Van Zanten | 73/35 |
| 4,492,121 | 1/1985 | Lehto | 73/705 |
| 4,515,132 | 5/1985 | Anderson et al. | 123/494 |

Primary Examiner—Willis R. Wolfe
Attorney, Agent, or Firm—Harness, Dickey & Pierce

[57] ABSTRACT

An internal combustion engine having a luminosity probe and an arrangement for adjusting the running parameters of the engine to obtain the desired luminosity. Also disclosed is an arrangement for maintaining uniformity from cycle to cycle in a given combustion chamber and uniformity combustion in the combustion chambers of a multi-chamber engine.

11 Claims, 1 Drawing Sheet

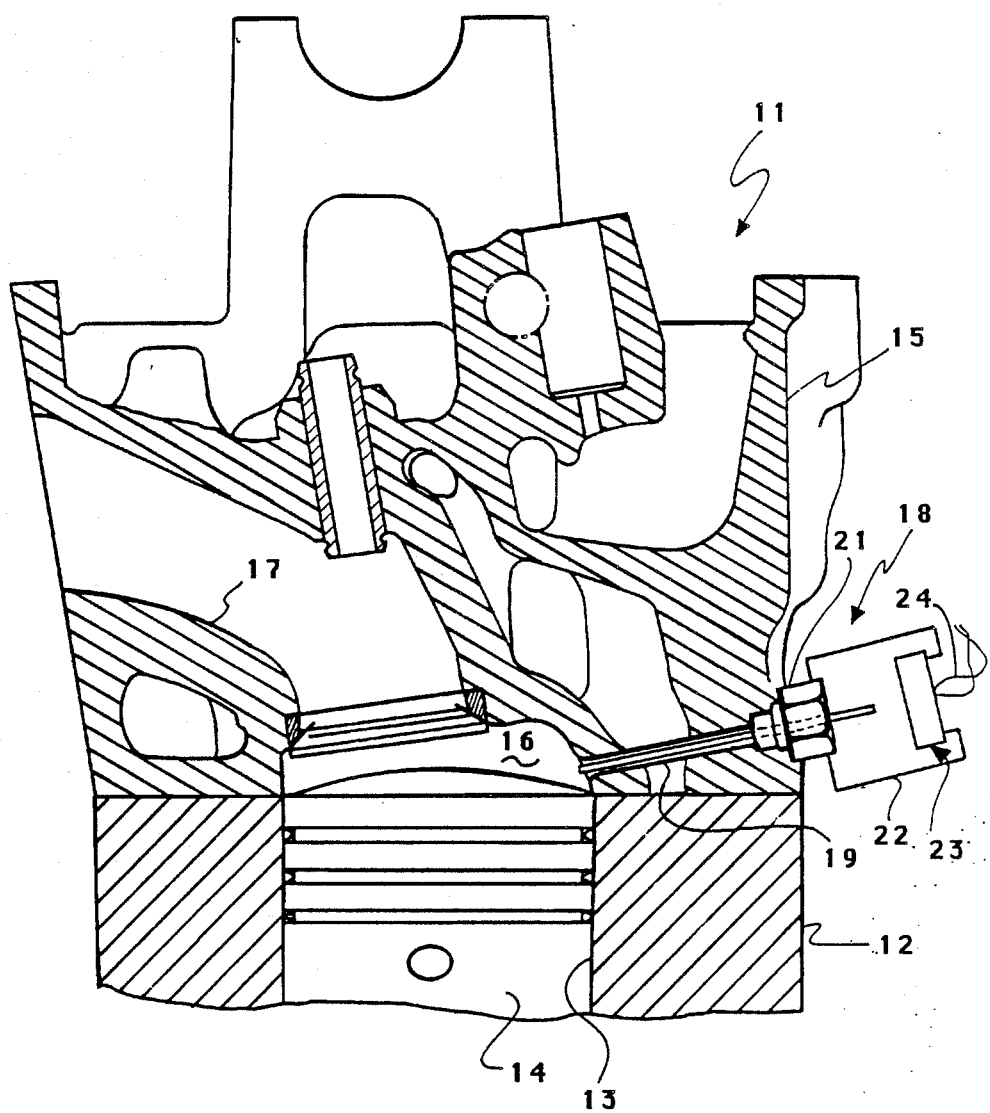

METHOD OF OPERATING AN ENGINE

BACKGROUND OF THE INVENTION

This invention relates to a method of operating an engine and an engine apparatus and more particularly to an improved method and apparatus for operating an engine in response to actual conditions in the combustion chamber during each combustion cycle.

With the modern technology and electronics many of the components and running conditions of an internal combustion engine can be controlled more accurately than with previous mechanical systems. For example, the control of the fuel/air ratio, spark timing and other adjustable factors of engine operation are greatly facilitated through the use of electronic components and electronic computers. However, in order to accurately sense the running of the engine and the combustion during each combustion cycle, it is necessary to provide a sensor that is directly positioned within the combustion chamber or in proximity to it and which senses the actual combustion conditions in the engine. Most engine controls employ external devices such as oxygen sensors or knock sensors which actually sense only average conditions due to their inherent nature.

It has been understood that knocking can be determined by an optical sensor that operates within the combustion chamber and which senses the luminosity of the gases in that chamber. A wide variety of knock sensors have been proposed that employ such sensors. However, the inventors have discovered that luminosity in the combustion chamber can indicate a much wider range of running conditions that previously realized.

It is, therefore, a principal object of this invention to provide an improved system and method for operating an engine wherein the engine adjustable parameters can be varied in response to actual sensed conditions in the combustion chamber during each combustion cycle.

It is a further object of this invention to provide an engine control system wherein the engine can be controlled in response to actual combustion conditions occurring in the combustion chamber on individual cycles.

Because of the aforenoted averaging tendency of the prior art type of sensors, it is also difficult to determine the existence of cylinder to cylinder or cycle to cycle variation. It is, therefore, a still further object of this invention to provide an improved system for sensing engine operation and sensing and determining cycle to cycle and chamber to chamber variations during running.

A type of engine sensor has been proposed that senses the actual luminosity of the gases within the combustion chamber. A wide variety of patents illustrating and describing the use of such sensors have issued including the following:

U.S. Pat. No. 4,358,952,
U.S. Pat. No. 4,369,748,
U.S. Pat. No. 4,377,086,
U.S. Pat. No. 4,393,687,
U.S. Pat. No. 4,409,815,
U.S. Pat. No. 4,412,446,
U.S. Pat. No. 4,413,509,
U.S. Pat. No. 4,419,212,
U.S. Pat. No. 4,422,321,
U.S. Pat. No. 4,422,323,
U.S. Pat. No. 4,425,788,
U.S. Pat. No. 4,468,949,
U.S. Pat. No. 4,444,043,
U.S. Pat. No. 4,515,132.

For the most part, these patents disclose arrangements wherein the sensor is utilized to sense only total luminosity and to equate the luminosity signal to a knocking signal. However and as has been noted, the inventors have discovered that this signal can also be employed to sense a wide variety of other engine running characteristics and it is a further object of this invention to use these signals to control the engine parameters to obtain better running and to obtain consistent running from cylinder to cylinder and cycle to cycle.

SUMMARY OF THE INVENTION

This invention is adapted to be embodied in a method of operating an internal combustion engine and an apparatus therefor that has a combustion chamber and means for forming a combustible fuel air mixture within the combustion chamber. In accordance with this feature of the invention, the luminosity of the gases in the combustion chamber is sensed and the fuel air ratio is adjusted to maintain the desired luminosity.

In accordance with another feature of the invention, there is provided a method and apparatus for operating an internal combustion engine having a combustion chamber and means for providing a fuel air mixture within the combustion chamber and for igniting that fuel air mixture. In accordance with this feature of the invention, the luminosity of the gases in the combustion chamber is measured and the engine running characteristics are adjusted so as to maintain the desired degree of luminosity and the peak pressure rate at the desired crank or output shaft angle.

Another feature of the invention is also adapted to be embodied in a method of operating an internal combustion engine having a combustion chamber and means for causing combustion to occur in the combustion chamber. In accordance with this feature of the invention, the luminosity of the gases in the combustion chamber are sensed during each combustion cycle and the engine is adjusted to minimize cyclic variations.

Yet another feature of the invention is adapted to be embodied in a method and apparatus for operating a multi-combustion chamber internal combustion engine that includes mean for effecting combustion in each of the combustion chambers. In accordance with this feature of the invention, the luminosity of the gases are sensed in each of the combustion chamber and adjustments are made so as to maintain uniformity between the luminosity in the various combustion chambers.

BRIEF DESCRIPTION OF THE DRAWINGS

The single FIGURE of drawings illustrates a cross-sectional view taken through a single combustion chamber of a multiple cylinder internal combustion engine constructed and operated in accordance with embodiments of the invention.

DETAILED DESCRIPTION OF THE PREFERRED EMBODIMENTS

Referring to the single FIGURE of the drawings, a multiple cylinder internal combustion engine is identified generally by the reference numeral 11. It is to be understood that, although the invention has particular utility in multiple cylinder engines, certain facets of the invention may find application in single cylinder engines. Also, although the invention is described in conjunction with a reciprocating type engine, the principles of the engine may be utilized with engines of the non-reciprocating, such as rotary, type and with engines operating on either two stroke or four stroke cycles.

Inasmuch as the invention is directed primarily with the combustion chamber and the conditions therein, only a cross-sectional view taken through one of the combustion chambers is believed to be necessary to understand the invention. This cross-sectional view shows a cylinder block 12 having a cylinder bore 13 in which a piston 14 is supported for reciprocation. The piston 14 is connected by means of a connecting rod (not shown) to a crankshaft for providing output power from the engine.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with the combustion chamber 15 controlled by poppet type intake and exhaust valves (not shown) for admitting a charge to the combustion chamber 15 and for discharging the burnt charge from the combustion chamber.

The charge admitted to the combustion chamber 16 may comprise pure air or a fuel/air mixture that is formed by a suitable charge former such as a port or throttle body type fuel injector or carburetor. Alternatively, if pure air is injected, direct cylinder injection may be employed for injecting fuel into the combustion chamber 16 to form the fuel air mixture. The fuel air ratio may be controlled in any of a wide variety of known manners such as by means of throttle vales, fuel control valves, injection duration, injection timing, etc. Although an important feature of the invention is the parameters under which the fuel air ratio are controlled, the actual physical hardware for adjusting the fuel air ratio forms no part of the invention.

The engine 11 may be of the diesel or spark ignited type but the types of controls exercised and the nature of luminosity sensing may vary with the engine type. The following discussion is concerned primarily with a spark ignited engine. If the engine 11 is of the diesel type, combustion is initiated through the timing of the direct cylinder fuel injection or in any of the other known manners normally employed in connection with diesel engines. If, on the other hand, the engine 11 is of the spark ignited type, a spark plug will be carried in the cylinder head 15 and have its gap exposed in the combustion chamber 16. The spark timing is controlled by a suitable mechanism which may be of any conventional type; however, the timing of the spark firing can be varied in accordance with parameters, hereinafter to be described.

As has been previously noted, the invention is capable of embodiment in any of a wide variety of conventional types of internal combustion engines and, for that reason, the details of the engine construction are not necessary to understand how the invention can be practiced by those skilled in the art. However, in accordance with the invention there is provided in the combustion chamber 16, a luminosity detector, indicated generally by the reference numeral 18. The luminosity detector 18 includes a fiber optic probe 19 or other types of optical access which extends through the cylinder head 15 and has its end terminating at the combustion chamber 16. Although the fiber optic probe 19 may be of any type, a high temperature glass bundle consisting of boresilicate clad crown glass which exhibits nearly flat spectral response in the range to be sensed has been found to be particularly advantageous. A probe having a diameter of 0.06 inches has been found to be practical and makes it relatively easy to install in the cylinder head.

The fiber optic probe 19 is held in place by means of a compression fitting 22 and has its outer end disposed within a light sealed housing 22 in proximity to a silicon photo detector 23. In one application the detector 23 specifically had a peak response of 0.74 microns with a fifty percent band width of 0.08 microns, although other types of detectors can be utilized depending upon the type of fiber optic probe employed. The detector 23 is connected to a remotely positioned computer control unit by means of conductors 24.

The remotely positioned control unit may be of any suitable type and is particularly adapted to transmit the signal from the silicon photo detector 23 into an output indicative of luminosity within the combustion chamber 16. Various luminosity spectra may be detected or merely a total luminosity signal may be read. It has been found that certain constituents of the glowing gases in the combustion chamber 16 glow at different spectral ranges and this may be utilized to sense the amount and condition of such components in the combustion chamber 16 during each cycle of operation.

It has been discovered that a wide variety of combustion phenomena and other characteristics can be determined by the luminosity probe 18 and the signals employed to adjust the parameters of the engine to obtain optimum performance. For example, the luminosity signal is a signal which gives a very good indication of the start of combustion. Heat release analysis indicates that one percent (1%) fuel mass burn fraction coincides with the start of the luminosity signal and the location of ninety percent (90%) mass burn fraction coincides with the return of the luminosity signal to zero. Thus, unlike cylinder pressure or other parameters, the luminosity signal clearly defines the actual start of combustion and combustion duration.

Therefore, the output of the luminosity probe 18 may be employed to control spark timing or injection timing in a diesel engine so as to control when combustion begins to obtain optimum performance characteristics. The control circuitry and mechanism for adjusting either spark timing or the initiation of injection in a diesel engine in response to this signal are believed to be well within the scope of those skilled in the art once they understand that the luminosity signal is indicative of the start of combustion and also that this signal can be used so as to control the beginning of combustion. Also, the duration of the signal can be utilized to determine the amount of fuel which has been or should be injected or introduced into the cylinder from a carburetor or port type injector so as to obtain the desired burn time.

In addition to the beginning and ending of combustion, the luminosity signal also provides an indication of heat release and also be employed so as to control the beginning of combustion and or the amount of fuel introduced so as to provide the desired heat release and timing cycles. It has been noted that peak luminosity and maximum rate of heat release are substantially the same and hence the engine parameters may be controlled in conjunction with the luminosity signal to provide the desired rate of heat release.

It has also been noted that the luminosity signal is very sensitive to air/fuel ratio variations when all other conditions are held constant and, accordingly, the luminosity probe 18 can be used as a detector of in cylinder air/fuel ratio for adjusting the charge former so as to provide the desired air/fuel ratio in response to any preset program.

In addition to the aforenoted factors, such conditions as high pressure or hot cycles produce sharp luminosity signals whereas partial burn cycles produce weak luminosity signals. Complete misfire results in no luminosity signals and hence the luminosity signal may be employed so as to sense cylinder to cylinder or cycle to cycle variations and the engine parameters adjusted to minimize such variations.

It should be readily apparent that the use of the luminosity probe is extremely effective in sensing a wide variety of running characteristics within the combustion chamber and variations from chamber to chamber and cycle to cycle. Those skilled in the art armed with this knowledge should be able to provide the various engine controls such as the timing of spark ignition and timing and duration of fuel injection or changing of fuel/air ratios through premixing devices such as carburetors or port injectors so as to obtain optimum performance and minimum cycle to cycle and cylinder to cylinder variations. As has been previously noted, the presence of certain combustion products may also be sensed by sensing specific light ranges in the cylinder to obtain optimization of these factors.

The foregoing description is that of a preferred embodiment of the invention and various changes in modifications may be made without departing from the spirit and scope of the invention, as defined by the appended claims.

We claim:

1. The method of operating an internal combustion chamber, means for forming a combustible fuel/air mixture within the combustion chamber and means for detecting the luminosity within the combustion chamber during each cycle of operation of the engine from prior to initiation of combustion until after the completion of combustion process, and adjusting the fuel/air ratio to maintain the desired luminosity characteristics.

2. The method of operating an internal combustion engine as set forth in claim 1 wherein the fuel/air ratio is adjusted to maintain peak luminosity during the burning cycle.

3. The method of operating an internal combustion engine having a combustion chamber, means for providing a fuel/air mixture within said combustion chamber, means for igniting the fuel/air mixture, and means for sensing the luminosity of the gases in the combustion chamber during the period from prior to the initiation of combustion until after completion of combustion and adjusting the engine running condition so as to maintain the desired luminosity in relation to output shaft angle.

4. The method of operating an internal combustion engine as set forth in claim 3 wherein the luminosity is maintained at a maximum during the burn cycle at the desired crank angle.

5. The method of operating an internal combustion engine having a combustion chamber, means for causing combustion to occur in said combustion chamber and means for sensing the luminosity in the combustion chamber, adjusting the running of the engine to maintain uniform luminosity during successive cycles of operation of the engine.

6. The method of operating an internal combustion engine having multiple combustion chambers, means for effecting combustion within said combustion chambers, and means for sensing the luminosity in each of the combustion chambers, comprising the steps of adjusting the running of the engine to maintain uniform luminosity in all of the combustion chambers.

7. The method of measuring the air/fuel ratio within the combustion chamber of an internal combustion engine driving a single cycle comprising the steps of detecting the luminosity within the combustion chamber from prior to the initiation of combustion, and calculating the fuel/air ratio from the luminosity signal.

8. The method of measuring the start of combustion in the combustion chamber of an internal combustion engine during a single cycle comprising the steps of sensing the luninosity within the combustion chamber from prior to the initiation of combustion and determining that combustion has begun when the luminosity of the gases in the combustion chamber exceeds a predetermined value.

9. The method of measuring combustion in an internal combustion engine as set forth in claim 8 wherein the duration when the luminosity exceeds a predetermined value is measured during the single cycle.

10. The method of measuring the heat release in the combustion chamber of an internal combustion engine during a single cycle comprising the steps of measuring the luminosity in the combustion chamber during the cycle and relating the value of the luminosity signal to the heat release with the combustion chamber.

11. The method of determining the existence of the misfires in the combustion chamber of an internal combustion engine during a single cycle comprising the steps of measuring the luminosity in the combustion chamber, and determining that a misfire has occured if the luminosity signal is below a predetermined value.

* * * * *